(12) United States Patent
Lee et al.

(10) Patent No.: US 9,396,107 B2
(45) Date of Patent: Jul. 19, 2016

(54) MEMORY SYSTEM HAVING MEMORY CONTROLLER WITH CACHE MEMORY AND NVRAM AND METHOD OF OPERATING SAME

(71) Applicant: SAMSUNG ELECTRONICS CO., LTD., Suwon-si, Gyeonggi-do (KR)

(72) Inventors: Joon-Ho Lee, Hwaseong-si (KR); Hyun-Seok Kim, Goyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 280 days.

(21) Appl. No.: 14/079,661

(22) Filed: Nov. 14, 2013

(65) Prior Publication Data

US 2014/0136767 A1    May 15, 2014

(30) Foreign Application Priority Data

Nov. 14, 2012  (KR) .......................... 10-2012-0129094

(51) Int. Cl.
| | |
|---|---|
| *G06F 12/00* | (2006.01) |
| *G06F 12/02* | (2006.01) |
| *G06F 9/44* | (2006.01) |
| *G06F 12/10* | (2016.01) |

(52) U.S. Cl.
CPC .......... *G06F 12/0246* (2013.01); *G06F 9/4411* (2013.01); *G06F 12/10* (2013.01); *G06F 12/1009* (2013.01); *G06F 2212/7201* (2013.01); *G06F 2212/7209* (2013.01)

(58) Field of Classification Search
CPC .............. G06F 12/0246; G06F 9/4411; G06F 2212/7201; G06F 2212/7209
See application file for complete search history.

(56) References Cited

U.S. PATENT DOCUMENTS

| | | |
|---|---|---|
| 2009/0198952 A1 | 8/2009 | Khmelnitsky et al. |
| 2011/0082967 A1 | 4/2011 | Deshkar et al. |
| 2011/0093650 A1 | 4/2011 | Kwon et al. |
| 2011/0099326 A1 | 4/2011 | Jung et al. |
| 2011/0145477 A1 | 6/2011 | Rudelic |
| 2011/0289352 A1 | 11/2011 | Lee et al. |
| 2013/0304979 A1* | 11/2013 | Zimmer .................. G06F 13/14 711/103 |
| 2015/0134878 A1* | 5/2015 | Ash ....................... G06F 7/0685 711/103 |

* cited by examiner

*Primary Examiner* — Reginald Bragdon
*Assistant Examiner* — Mehdi Namazi
(74) *Attorney, Agent, or Firm* — Volentine & Whitt, PLLC

(57) ABSTRACT

In a memory system including a flash memory and a memory controller having a cache memory and a nonvolatile random access memory (NVRAM), a method of operating the memory system includes; receiving a write request specifying a write operation directed to a page of a designated active write block in the flash memory, storing a page mapping table for the active write block in the cache memory, generating update information for the page mapping table stored in the cache memory as a result of executing the write operation, and storing the update information in the NVRAM, and storing an updated version of the page mapping table in the flash memory after execution of the write operation is complete.

15 Claims, 7 Drawing Sheets

| | BLK | |
|---|---|---|
| PAG0 | LSN # | uDTA0 |
| PAG1 | LSN # | uDTA1 |
| PAG2 | LSN # | uDTA2 |
| ⋮ | ⋮ | ⋮ |

MEMORY SYSTEM HAVING MEMORY CONTROLLER WITH CACHE MEMORY AND NVRAM AND METHOD OF OPERATING SAME

CROSS-REFERENCE TO RELATED APPLICATIONS

This application claims the benefit of Korean Patent Application No. 10-2012-0129094 filed on Nov. 14, 2012, the subject matter of which is hereby incorporated by reference.

BACKGROUND

The inventive concept relates to memory systems and methods of operating same. More particularly, the inventive concept relates to memory systems including a mapping table capable of being stored in nonvolatile memory, as well as methods of operating memory systems more efficiently and with greater stability.

As the data processing demands placed upon contemporary memory systems increases, the speed with which constituent memory device(s) operates also increases. This is true for memory system initiation processes, wherein memory system resources must be faithfully and efficiently restored upon memory system power-up.

SUMMARY

Embodiments of the inventive concept provide a method of operating a memory system including a flash memory and a memory controller having a cache memory and a nonvolatile random access memory (NVRAM). One method consistent with the inventive concept includes; receiving a write request specifying a write operation directed to a page of a designated active write block in the flash memory, storing a page mapping table for the active write block in the cache memory, generating update information for the page mapping table stored in the cache memory as a result of executing the write operation, and storing the update information in the NVRAM, and storing an updated version of the page mapping table in the flash memory after execution of the write operation is complete.

Another method consistent with the inventive concept includes; storing first and second page mapping tables respectively related to first and second blocks of the flash memory in the cache memory, receiving a write request specifying a write operation directed to first and second pages respectively located in the first and second blocks, generating respective update information for the first and second page mapping tables stored in the cache memory as a result of executing the write operation, and storing the update information in a PRAM, and storing an updated versions of the first and second page mapping tables in the flash memory only after execution of the write operation is complete.

Embodiments of the inventive concept also provide a method of operating a secure digital (SD) card including a NAND flash memory and a memory controller having a SRAM cache memory and PRAM. One method consistent with the inventive concept includes; receiving a write request specifying a write operation directed to a page of a designated active write block in the NAND flash memory, storing a page mapping table for the active write block in the SRAM, generating update information for the page mapping table stored in the SRAM as a result of executing the write operation, and storing the update information in the PRAM, and storing an updated version of the page mapping table in the flash memory after execution of the write operation is complete.

BRIEF DESCRIPTION OF THE DRAWINGS

Certain embodiments of the inventive concept are illustrated in the accompanying drawings in which.

DETAILED DESCRIPTION

Certain embodiments of the inventive concept will now be described in some additional detail with reference to the accompanying drawings. These embodiments are provided so that this disclosure will be thorough, complete and fully convey the making and uses of the inventive concept to those of ordinary skill in the art. The scope of the inventive concept is not limited to only the illustrated embodiments, but extends to modifications, equivalents, and replacements that will be recognized by those skilled in the art. Throughout the written description and drawings like reference numbers and labels are used to denote like or similar elements.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
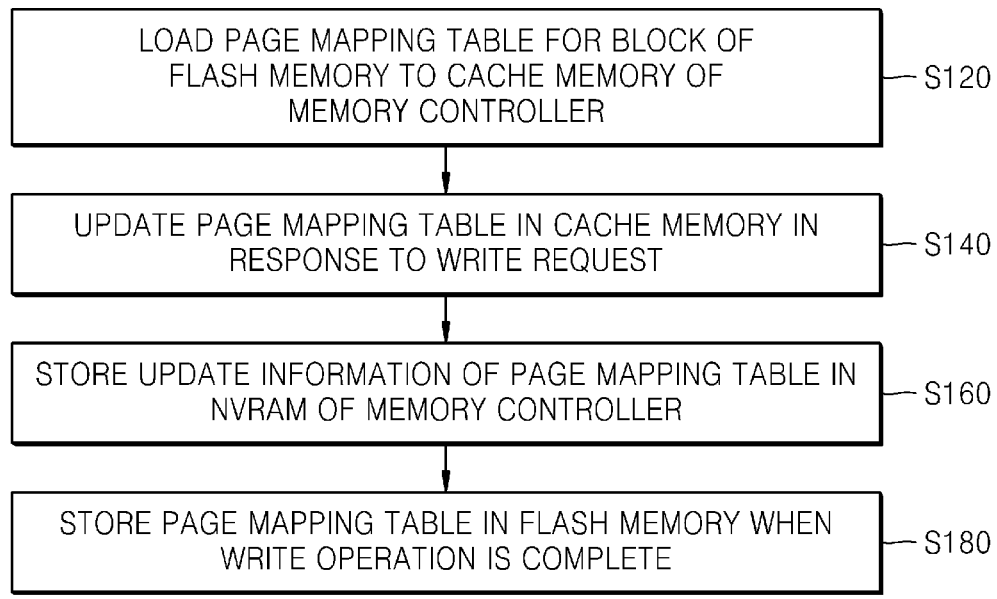
FIG. 1 is a flowchart summarizing a method of operating a memory system, according to an embodiment of the inventive concept.
Figure 2:
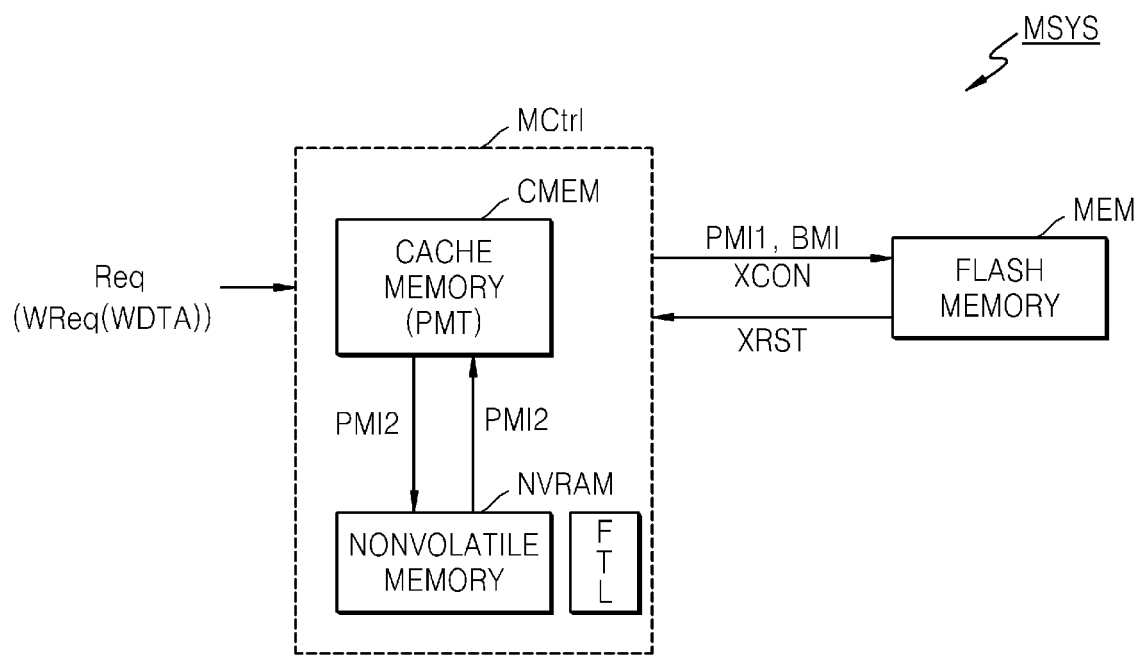
FIG. 2 is a block diagram illustrating a memory system according to an embodiment of the inventive concept.

FIG. 1 is a flowchart summarizing one method of operating a memory system according to an embodiment of the inventive concept. FIG. 2 is a block diagram illustrating a memory system (MSYS) including a flash memory (MEM) and a memory controller (MCtrl) according to an embodiment of the inventive concept.

Referring to FIGS. 1 and 2, the method of operating the memory system includes loading a page mapping table (PMT) related to a block of the flash memory that has been allocated in response to a write request (WReq) received from an external source (e.g., a host device). The page mapping table is loaded to a cache memory (CMEM) included in a memory controller (S120).

Thereafter, the page mapping table stored in the cache memory is updated in response to the write request (S140). Then, the resulting "update information" (PMI2) of the page mapping table is stored in a nonvolatile random access memory (NVRAM) included in the memory controller (S160). And then, the page mapping table is stored in the flash memory once the write operation indicated by the write request (and allocating the block of flash memory) is complete (S180).

Thus, the memory controller controls the execution of a write operation by the flash memory, as indicated by the write request received from (e.g.,) a host device (not shown). In this regard, the memory controller may be used to generate control signal(s) (singularly or collectively indicated as, XCON) enabling the flash memory to perform a requested operation (e.g., write operation, read operation, and/or erase operation).

In the embodiment of the inventive concept illustrated in FIG. 1, the memory controller comprises the cache memory and the NVRAM. The cache memory may be used to temporarily store incoming "write data" related to a write request, and/or outgoing "read data" related to a read request. The cache memory may also be used to temporarily store various information associated with an externally-provided request (Req). The page mapping table related to the block of flash memory indicated by a write request (Wreq) is one example of such information that may be temporarily stored in the cache memory. Hereafter, a particular block of flash memory indicated by a current request will be referred to as an "active block." Thus, where a write request indicates a block of flash memory in which certain write data should be programmed, said block may be referred to as the "active write block."

In the foregoing method, certain "update information" (PMI2) for the page mapping table derived as a result of processing an active write block according to a write request is stored in the NVRAM (S160). Thus, for example, the current data state for the active write block—as the result of performing the requested write operation on constituent memory cells of the active write block—will be stored in the NVRAM. Certain embodiments of the inventive concept capable of "updating" and/or "restoring" page mapping information related to a block of flash memory will be described in some additional detail hereafter.

An "updated page mapping table" (PMI1) related to the active write block following completion of the requested write operation is stored in the flash memory (S180). In this context, the term "completed" means an active block (e.g., a block indicated by a write request) on the corresponding operation (e.g., the write operation defined by the write request) cannot be further performed. For example, a write operation directed to an active write block may be said to be "completed" when a page of the active write block to which write data should be programmed is not valid, or when a page of the active write block does not have sufficient available memory space to store the write data (WDTA) provided with the write request. In such cases, the memory controller may allocate a "new" page of the active write block.

However, should a circumstance arise wherein all pages of a particular active write block are "invalid" for one reason or another, a current write operation directed to the active write block must be discontinued (or canceled). In this regard, an "invalid page" may be understood as a page in which stored data has been newly written (or copied) in another space (e.g., a page of another block), or a page which has been updated, or a page containing invalid (e.g., data written during an abnormal write operation), etc. In such cases, the memory controller may erase the entire block using an erase operation. According to certain embodiments of the inventive concept such as the memory system of FIG. 2, an updated page mapping table (PMI1) related to an active write block associated with a "discontinued write operation" should not be loaded to the cache memory of the memory controller, but should instead be stored in the flash memory.

Referring to FIG. 2, the flash memory may be a vertical NAND (VNAND) flash memory, or a horizontal NAND flash memory including constituent flash memory cells that are operated as single level flash memory cells (SLC) and/or multi-level flash memory cells (MLC). However configured, the flash memory will perform a requested operation as indicated by a corresponding control signal provided by the memory controller. Further in response, the flash memory may provide a feedback result (XRST) associated with execution of the requested operation back to the memory controller. For example, the flash memory may perform a write operation in response to a write request that generates a control signal, and then provide a corresponding feedback result for the requested operation informing the memory controller, at a minimum, whether the requested operation was successfully executed within the flash memory.

Although FIG. 2 illustrates the flash memory as a single unit, the scope of the inventive concept is not limited thereto. According to other embodiments of the inventive concept, the memory system (MSYS) may include a plurality of flash memories or multiple flash memories arranged in a plurality of groups. However, for convenience of explanation, FIG. 2 illustrates only a single element as the flash memory of the memory system. Those of ordinary skill in the art will further appreciate that the memory system of FIG. 2 may include other general elements common to contemporary memory systems. For example, various interface units respectively capable of interfacing with an external device or the flash memory may be conventionally provided, or a processor configured to control the overall operation of the memory controller may be conventionally provided.

In certain embodiments of the inventive concept, the memory system (MSTS) of FIG. 2 may include a memory controller (MCtrl) having a flash translation layer (FTL). The FTL may be used to translate an "external address" included in a received request into an "internal address" understood by (or correlated with) the flash memory MEM. For example, a "logical block address" (LBA) included in a request received from a host device by the memory system of FIG. 2 may be translated or "mapped" to a corresponding "physical block address" (PBA) associated with the memory space provided by the flash memory. In one example, a LBA may be expressed by an external host device as a logical sector unit, while the corresponding PBA unit understood by the flash memory may expressed in terms of a block and page(s). Thus, in order to program write data provided by the external host device during a write operation, a page mapping table may be used to map a sector number (i.e., a LBA) to a corresponding page number (i.e., a PBA) for the flash memory. Those skilled in the art will understand that logical sector number(s) and corresponding page number(s) may be different in size. For example, a logical sector number may be expressed in terms of a 512 byte size, while a page number may be expressed in terms of a 8K byte size. In such a case, sixteen (16) logical sector numbers would map onto a single page number.

Also, since execution of an erase operation in the flash memory MEM is usually performed in block units, block mapping information (BMI) associated with logical block addresses as well as physical block addresses are required to perform an erase operation. For example, as conceptually illustrated in FIG. 3, a physical block address PBA map to a logical block address LBA. For example, blocks 1 and 2 of the flash memory map to a first logical block address LBA 0, a block 15 of the flash memory MEM maps to a second logical block address LBA 1, and a block 7 of the flash memory MEM maps to a third logical block address LBA 2.

Figure 3:
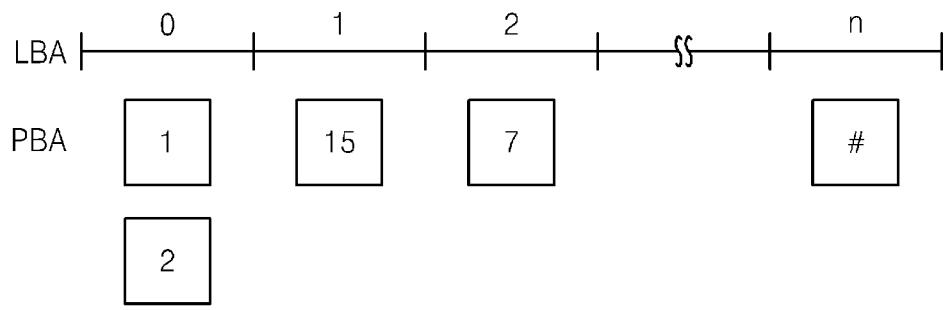
FIG. 3 is a conceptual diagram illustrating the mapping of logical block address(es) (LBA) onto physical block address(es) (PBA) according to an embodiment of the inventive concept.

"Block mapping information" (BMI) regarding the logical block address LBA 0 of FIG. 3 mapping to the blocks 1 and 2 of the flash memory may be derived and provided (e.g.,) in the form of [LA0:PA1, PA2], where 'PA2' denotes the block 2 that is last mapped to the logical address LBA 0. If a block 3 were additionally allocated to the first logical block address LBA 0, the corresponding block mapping information might be expressed as [LA0:PA1, PA2, PA3], where 'PA3' denoting the block 3 is lastly mapped to the first logical address LBA 0. A block thus lastly mapped to a particular logical address may be an active block as described above.

Figure 4:
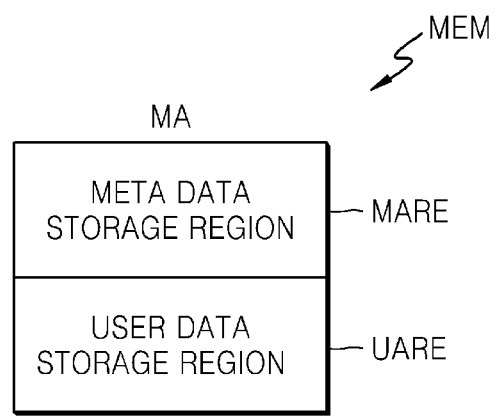
FIG. 4 is a diagram illustrating one possible structure for a memory cell array of a flash memory according to an embodiment of the inventive concept.

The block mapping information includes information indicating the location of a block in the flash memory. Once the block mapping information is updated, it may be stored in the flash memory. In particular, the block mapping information may be stored in a meta data storage region (MARE) of the memory cell array (MA) included in the flash memory, as illustrated in FIG. 4. That is, the memory cell array of FIG. 4 is divided into the meta data storage region (MARE) storing meta data (e.g., the block mapping information), and a user data storage region (UARE) storing user-defined data, or payload data such as write data. The meta data storage region and the user data storage region may be physically divided or logically divided one from another in the memory cell array. In this context, the term "logically divided" means that the meta data storage region and/or the user data storage region may be a region in available memory space allocated according to continuous logical addresses.

Figure 5:
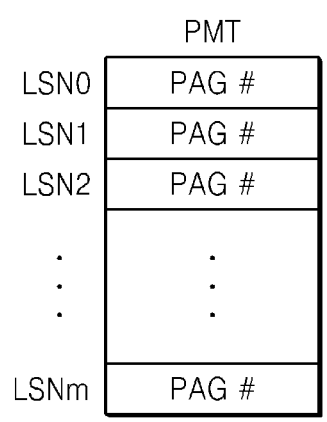
FIG. 5 is a diagram illustrating one possible page mapping table according to an embodiment of the inventive concept.

As described above, since a write operation is executed in the flash memory according to page unit(s), both the block mapping information and the page mapping table information are required. The information contained in the page mapping table (or "mapping table information") may be configured such that page numbers (PAG#) are respectively mapped to the logical sector numbers (LSN0 to LSNm) included in a logical address. In certain embodiments of the inventive concept, the page mapping table will be managed by the FTL and may have a format like the page mapping table shown in FIG. 5.

Referring back to FIG. 2, the illustrated memory system (MSYS) may be implemented on a memory card (e.g., a secure digital (SD) card). In order to reduce the data management overhead for such memory cards—which may include only marginally sufficient or insufficient resources—only the page mapping table related to an active write block (PMI1), wherein said page mapping table includes page mapping table information correlating logical addresses and physical addresses, will be stored in the flash memory.

Thus, in memory systems implemented as a memory card according to certain embodiments of the inventive concept, the page mapping table related to an active write block will be updated as a current write operation is executed. That is, information regarding the updated page mapping table (PMI2) may be stored in the NVRAM of the memory controller. Accordingly, the updated page mapping table loaded to the cache memory of the memory controller may be associated with an active write block that (1) has an ongoing (but as yet uncompleted) write operation directed it, or (2) has had a recently completed write operation directed to it.

In certain embodiments of the inventive concept, the NVRAM may be implemented using a phase-change random access memory (PRAM).

In certain embodiments of the inventive concept, the cache memory may be implemented using a static RAM (SRAM).

As described above, certain memory systems having limited resources, like memory systems implemented on a memory card, may not store an updated page mapping table information (PMI2) related to an active write block in flash memory until the current write operation is completed. Rather, only block mapping information (or updated block mapping information) may be stored in the flash memory. Given these assumptions, when the memory system of FIG. 2 is powered-off before a current write operation is completed (i.e., before the corresponding updated page mapping table for the active write block has been stored in the flash memory), the page mapping table stored in the cache memory should be deemed invalid and must therefore be restored. In this regard memory systems and memory system operating methods consistent with embodiments of the inventive concept are capable of rapidly and efficiently restoring a page mapping table related to an active block.

Figure 6:
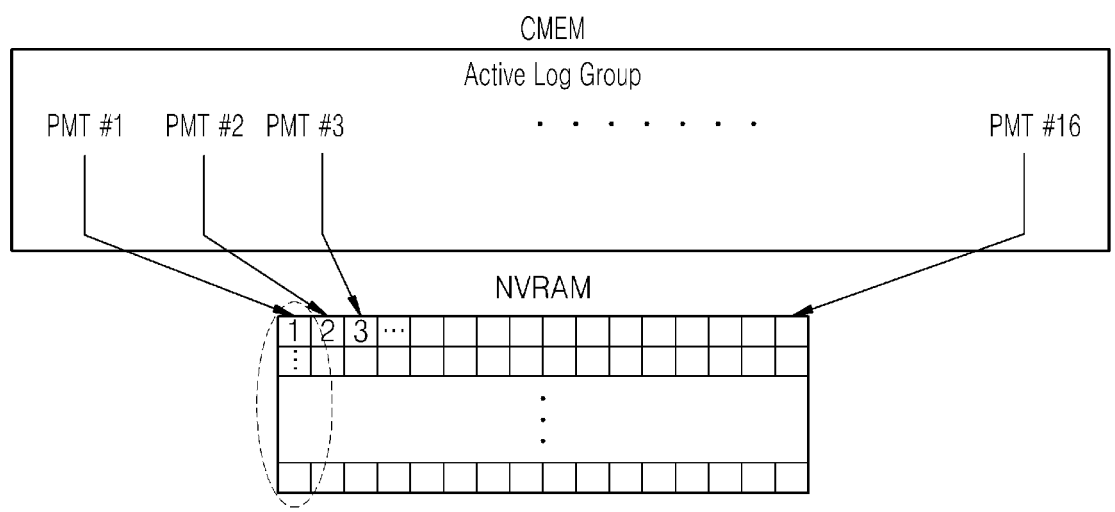
FIG. 6 is a diagram illustrating one possible approach to storing update information for a page mapping table stored in a phase-change random access memory (PRAM) included in certain embodiments of the inventive concept.

FIG. 6 is a conceptual diagram illustrating one possible approach that may be used to store updated page mapping table information in a nonvolatile random access memory (NVRAM) according to certain embodiments of the inventive concept.

Referring collectively to FIGS. 1, 2, and 6, a page mapping table related to an active block of flash memory is assumed to be loaded to the cache memory of the memory controller. However, "update information" (PMI2) for the cached page mapping table is stored in the NVRAM (S140) as described above.

In regard to FIG. 6, the cache memory (CMEM) is assumed to be SRAM, and the NVRAM is assumed to be PRAM. However, the scope of the inventive concept is not limited thereto, and the NVRAM may be implemented using resistive RAM (RRAM), magneto-resistive RAM (MRAM), ferroelectric RAM (FRAM), or the like.

Further assuming a plurality of active blocks (potentially associated with a plurality of active flash memory devices), any reasonable number of page mapping tables may be loaded to the cache memory at any given time. The combination of these page mapping tables, together with respective write data may be referred to as an "active log group".

Thus, FIG. 6 illustrates a memory state in which a first page mapping table (PMT#1) through a sixteenth page mapping table (PMT#16) have been stored in the cache memory. Consistent with a method of operating the memory system according to an embodiment of the inventive concept, whenever update information (PMI2) for a particular page mapping table loaded to the cache memory is generated during a requested operation, the update information (PMI2) will be stored in the NVRAM of the memory controller. For example, when write data is written to a first page of flash memory related to the first mapping table (PMT#1) stored in the cache memory, corresponding update information for the first mapping table (i.e., information mapping a logical address of the write data and a physical address of the page) will be stored in the NVRAM.

Figure 7:
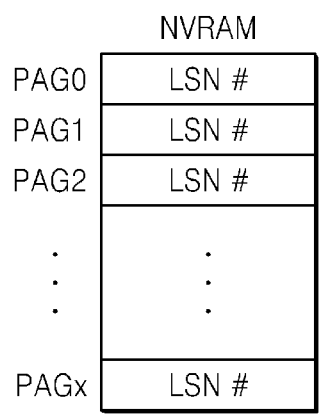
FIG. 7 is a diagram illustrating update information for the page mapping table stored in the PRAM of FIG. 6 according to certain embodiments of the inventive concept.

Additionally, the result of updating page mapping information related to an active block belonging to an active log group may be stored using a mapping relation between the logical address and physical address, as illustrated in FIG. 7. Hence, FIG. 7 illustrates a portion of the NVRAM of FIG. 6 corresponding to a column encircled by the dashed line.

Accordingly, a mapping relationship between a logical address and a physical address for each page of each block belonging to an active log group may be stored in the NVRAM, such that respective physical addresses for each page correspond to one storage region of the NVRAM, and a logical sector number for each page corresponds to one physical address of the NVRAM. For example, when update information for a page mapping table related to each page of each active block belonging to an active log group is stored in the NVRAM of FIG. 7, a logical sector number for a page 0 of the first page mapping table (PMT#1) of FIG. 6 may be stored in a storage region 1 of the NVRAM, and a logical sector number for a page 0 of the second page mapping table (PMT#2) may be stored in a storage region 2 of the NVRAM.

As described above, a logical sector number (logical address unit) and a page number (physical address unit) may be different in terms of size, and each page may thus be mapped to a plurality of logical sector numbers. Thus, the memory space required to store update information (PMI2) may be greater than that required to map relationships between logical address(es) and physical address(es). When a mapping relation of a physical address to a logical address is stored, a larger space may be required to store the update information PMI2 than in the case illustrated in FIG. 7, since the number of pages included in a block is greater than the number of logical sector numbers.

Figure 8:
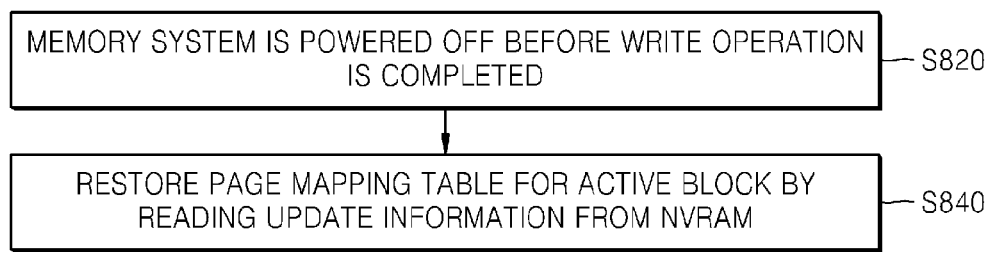
FIGS. 8, 9 and 10 are respective flowcharts illustrating methods of restoring a page mapping table that has been stored and updated using the method of FIG. 1 according to embodiments of the inventive concept.

As illustrated in FIG. 8, in a method of operating the memory system according to certain embodiments of the inventive concept, it is first assumed that the memory system has been powered-off before a write operation directed to an active write block was completed (S820). Thus, the page mapping table related to the active write block must be restored by reading update information from the NVRAM once the memory system is again powered-on (S840). In this manner, the page mapping table related to the active write block may be easily and rapidly restored by reading update information stored in a nonvolatile memory NVRAM of the memory controller.

Figure 9:
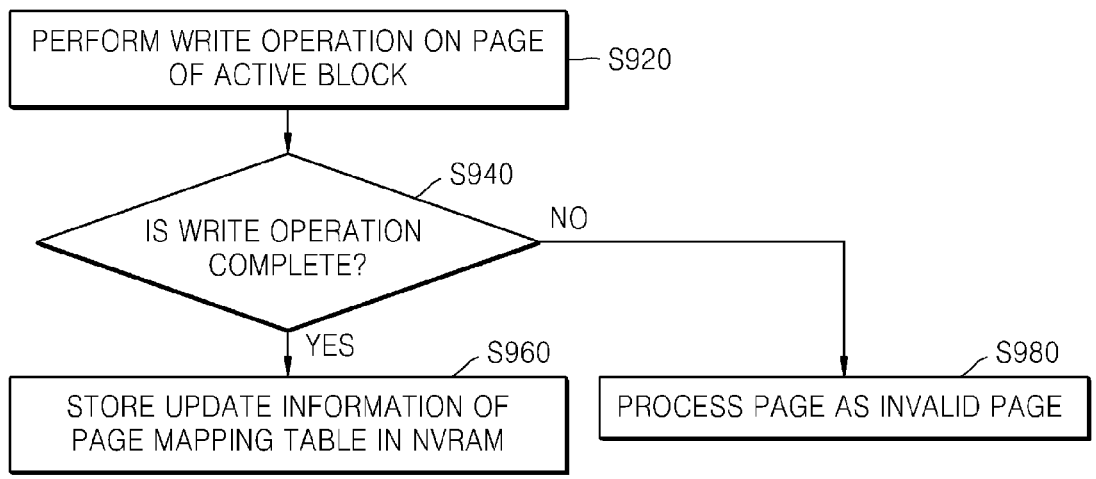

As illustrated in FIG. 9, in a method of operating the memory system according to certain embodiments of the inventive concept, update information for a page mapping table related to a page of an active write block may be stored in the NVRAM once a current write operation directed to the page has been completed. Thus, a write operation is performed as directed to a page of an active write block in response to a write request (S920). Once the write operation is complete (S940=YES), corresponding update information for a page mapping table related to the page of the active write block is stored in the NVRAM (S960).

In contrast, if the constituent memory system is powered-off before the write operation is complete (S940=NO), the page to which the write operation was directed is deemed invalid (S980). As described above, the update information PMI2 is stored in the NVRAM once the write operation is completed. Thus, even if the memory system is unexpectedly powered-off, the page mapping table related to the active block may be accurately restored upon subsequent memory system power-on.

Figure 10:
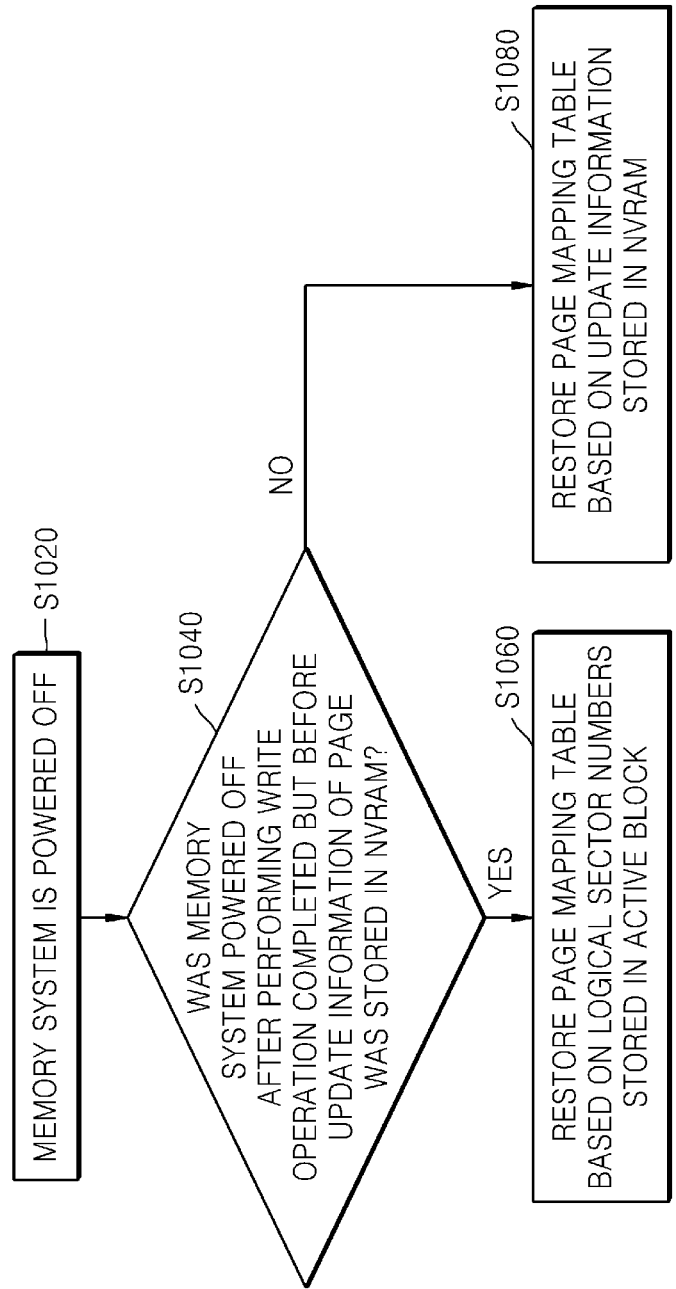

Also, as illustrated in FIG. 10, in a method of operating the memory system according to certain embodiments of the inventive concept, it is assumed that a memory system was powered off while performing a write operation (S1020). Accordingly, a more particular point in time at which the memory system was powered off must be determined (S1040), so that a proper page mapping table restoration operation may be performed (e.g., either S1060 or S1080).

Figures 11, 12:
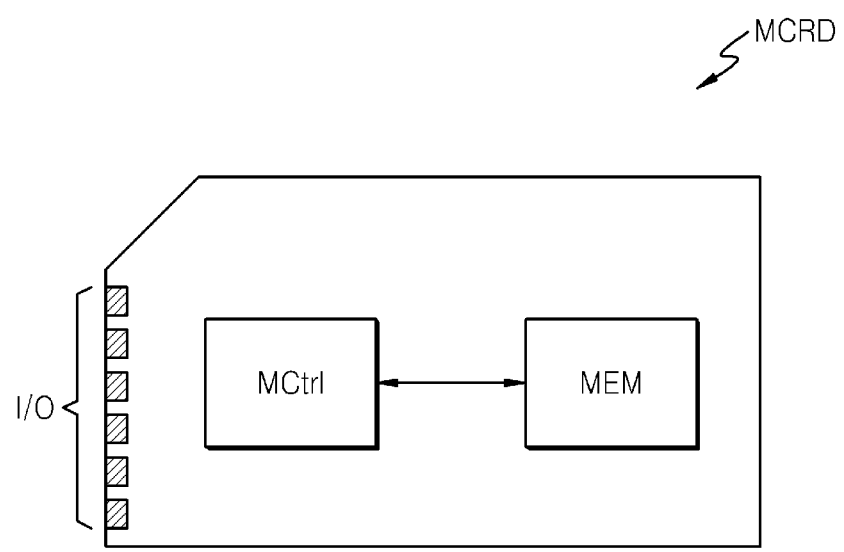
FIG. 11 is a diagram illustrating a memory block that may be used in certain embodiments of the inventive concept.
FIG. 12 is a block diagram of a memory card according to an embodiment of the inventive concept.

For example, when the memory system was powered off after the write operation directed to the page of an active write was completed, yet before the updated page mapping table information was stored in the NVRAM (S1040=YES), then the page is an invalid page. Thus, as illustrated in FIG. 11, the page mapping table related to the active write block should be restored based on the logical sector numbers stored in the active write block (S1060). For example, the active write block may be stored in a log block region (not shown) or a data block region (not shown) included in the user data storage region (UARE) of the memory cell array (MA) of FIG. 4 when the memory system MSYS is powered-off. Thus, a read operation may be required to be performed on the flash memory in order to restore the page mapping table.

FIG. 11 illustrates a case in which a plurality of pieces of user data UDTA0, UDTA1, UDTA2, . . . that are write data WDTA, and logical sector numbers LSN# corresponding to pages PAG0, PAG1, PAG2, . . . of a certain block BLK (e.g., a block on which a write operation is completed or a block on which a write operation is not completed) are stored in the pages PAG0, PAG1, PAG2, . . . , respectively. For example, when a flash memory MEM includes large blocks similar to a vertical NAND (VNAND) flash memory, etc., a page mapping table regarding each page may be restored by scanning each page as illustrated in FIG. 11, and it may thus take a considerable time to build the page mapping table. However, in the method of operating the memory system MSYS, according to an embodiment of the inventive concept, the scanning of each page of a block as illustrated in FIG. 11 is performed in consideration of an improvement in the reliability of the memory system MSYS, only when the memory system MSYS is powered-off after the write operation directed to a page of an active write block is completed and before update information for the page is stored in the NVRAM. If the memory system MSYS is powered off in other cases, the page mapping table related to the active write block will be restored based on update information stored in the NVRAM as described above (S1080). Accordingly, the page mapping table related to an active write block may be easily and rapidly restored.

FIG. 12 is a block diagram of a memory card MCRD according to an embodiment of the inventive concept. Referring to FIG. 12, the memory card (MCRD) according to an embodiment of the inventive concept including a memory controller (MCtrl) and a flash memory (MEM). The memory controller controls data to be written to or read from the flash memory in response to a request received from an external host (not shown) via an input/output (I/O) unit. If the flash memory of FIG. 12 is a flash memory device, the memory controller may control an erase operation to be performed on the flash memory. Although not shown, in the memory card according to an embodiment of the inventive concept, the memory controller may include interface units for interfacing with the external host and a memory device, respectively, and RAM in order to perform such control operations. In the memory card according to an embodiment of the inventive concept, the flash memory may be a flash memory device capable of performing programming according to a program method as described in FIG. 1.

The memory card illustrated in FIG. 12 may be embodied as a compact flash card (CFC), a micro-drive, a smart media card (SMC), a multimedia card (MMC), a secure digital card (SDC), a memory stick, a universal serial bus (USB) flash memory driver, etc.

Figure 13:
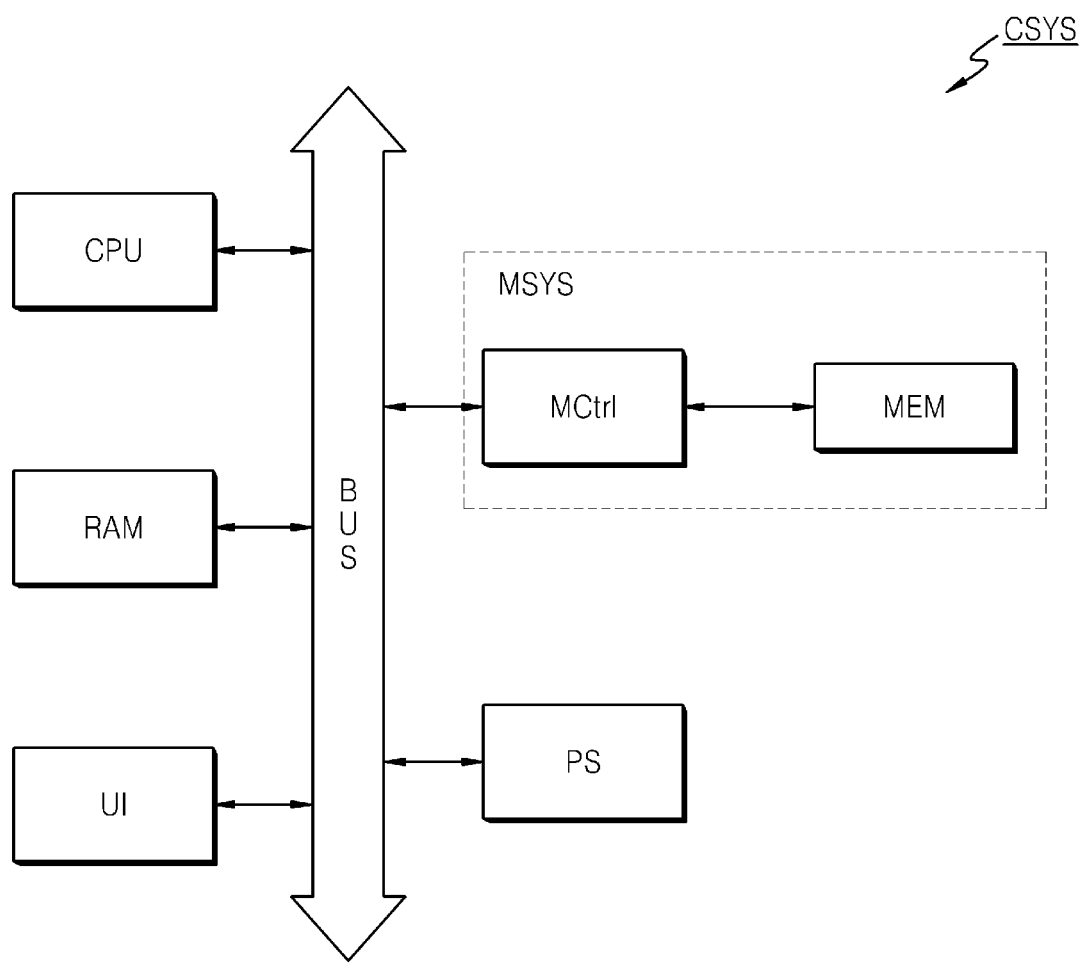
FIG. 13 is a block diagram of a general computational system according to an embodiment of the inventive concept.

FIG. 13 is a block diagram of a general computational system (CSYS) according to an embodiment of the inventive concept. The computational system according to an embodiment of the inventive concept includes a central processing unit (CPU), a user interface (UI), and a memory system (MSYS) that are electrically connected to a bus (BUS). The memory system includes a memory controller (MCtrl) and a flash memory (MEM). In the flash memory, N-bit data that is processed or to be processed by the processor CPU is stored via the memory controller. Here, N denotes an integer that is equal to or greater than '1'. The memory system apparatus of FIG. 13 may be operated according to the method of FIG. 1. According to an embodiment of the inventive concept, the memory system may further include a power supply device (PS) and a system memory (RAM).

Although not shown, if the computational system of FIG. 13 may be a mobile apparatus further including a battery that supplies an operating voltage to the computational system, and a modem (e.g., a base-band chipset). Furthermore, it will be understood by those of ordinary skill in the art that the computational system of FIG. 13 may further include an application chipset, a camera image processor (CIS), a mobile DRAM, etc.

The inventive concept has been particularly shown and described with reference to certain exemplary embodiments thereof disclosed in the drawings and detailed description. The specific terms used herein are not intended to restrict the scope of the inventive concept and only used for a better understanding of (to facilitate the understanding of) the inventive concept. It will be understood by those of ordinary skill in the art that various changes in form and details may be made without departing from the scope of the inventive concept as defined by the appended claims.

What is claimed is:

1. A method of operating a memory system including a flash memory and a memory controller having a cache memory and a nonvolatile random access memory (NVRAM), the method comprising: receiving a write request specifying a write operation to the flash memory;
   loading a page mapping table for a block of flash memory to the cache memory, wherein the block is corresponding to the write request;
   generating update information for the page mapping table loaded in the cache memory as a result of executing the write operation, and storing the update information in the NVRAM by storing at least one logical address corresponding to a physical address for at least one page of the block; and
   storing an updated version of the page mapping in the flash memory after execution of the write operation is complete,, and
   upon memory system power-on, determining that the memory system was powered-off before execution of the write operation was complete; and
   then,
   restoring the page mapping table based on the update information stored in the NVRAM.

2. The method of claim 1, wherein storing the update information in the NVRAM comprises storing a logical address corresponding to a physical address for at least one page of the block in a storage region of the NVRAM, wherein the storage region of the NVRAM corresponding to the physical address for the at least one page of the block.

3. The method of claim 1, wherein storing the update information in the NVRAM is performed whenever the page mapping table is updated.

4. The method of claim 1, wherein storing the update information in the NVRAM comprises storing update information related to a page of the block in the NVRAM after execution of the write operation for the page is completed.

5. The method of claim 4, further comprising:
   upon memory system power-on, determining that the memory system was powered-off after execution of the write operation was complete and before the update information was stored in the NVRAM; and then,
   restoring the page mapping table based on logical sector numbers written to the block.

6. The method of claim 1, wherein storing the updated version of the page mapping table in the flash memory is performed only when write operation is not directed to an invalid page of the block, and the write operation was completed.

7. The method of claim 1, wherein the NVRAM is a phase-change random access memory (PRAM).

8. The method of claim 1, wherein the memory system is mounted on a memory card.

9. A method of operating a secure digital (SD) card including a NAND flash memory and a memory controller having a phase-change random access memory (PRAM) and a static random access memory (SRAM), the method comprising:
   receiving a write request specifying a write operation directed to a page of a designated active write block in the NAND flash memory; storing a page mapping table for the active write block in the SRAM; generating update information for the page mapping table stored in the SRAM as a result of executing the write operation, and storing the update information in the PRAM by storing at least one logical address corresponding to a physical address for at least one page of the active write block; and storing an updated version of the page mapping table in the flash memory after execution of the write operation is complete; and
   upon SD card power-on, determining that the SD card was powered-off before execution of the write operation was complete; and
   then,
   restoring the page mapping table based on the update information stored in the PRAM.

10. The method of claim 9, wherein storing the update information in the PRAM comprises storing a logical address corresponding to a physical address for at least one page of the active write block in a storage region of the PRAM.

11. The method of claim 9, wherein storing the update information in the PRAM is performed whenever the page mapping table is updated.

12. The method of claim 9, wherein storing the update information in the PRAM comprises storing update information related to a page of the active write block in the PRAM after execution of the write operation for the page is completed.

13. The method of claim 12, further comprising:
upon SD card power-on, determining that the SD card was powered-off after execution of the write operation was complete and before the update information was stored in the PRAM; and then,
restoring the page mapping table based on logical sector numbers written to the active write block.

14. The method of claim 9, wherein storing the updated version of the page mapping table in the flash memory is performed only when write operation is not directed to an invalid page of the active write block, and the write operation was completed.

15. A method of operating a memory system including a flash memory and a memory controller having a cache memory and a phase-change random access memory (PRAM), the method comprising:
storing first and second page mapping tables respectively related to first and second blocks of the flash memory in the cache memory;

receiving a write request specifying a write operation directed to first and second pages respectively located in the first and second blocks;

generating respective update information for the first and second page mapping tables stored in the cache memory as a result of executing the write operation, and storing the update information in the PRAM;

storing an updated versions of the first and second page mapping tables in the flash memory only after execution of the write operation is complete; and upon memory system power-on, determining that the memory system was powered-off before execution of the write operation was complete; and then, restoring the first and second page mapping tables based on the update information stored in the PRAM.

\* \* \* \* \*